E. P. CHARLAND.
SELF FEEDER FOR THRESHING MACHINES.
APPLICATION FILED DEC. 30, 1909.
1,035,113.
Patented Aug. 6, 1912.
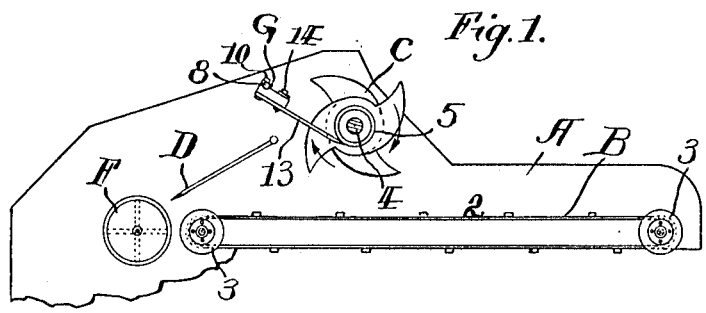
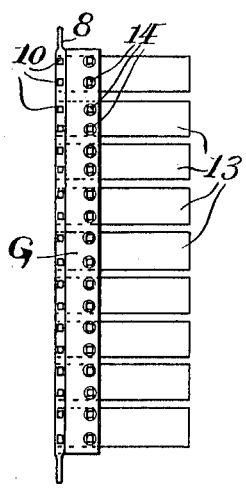
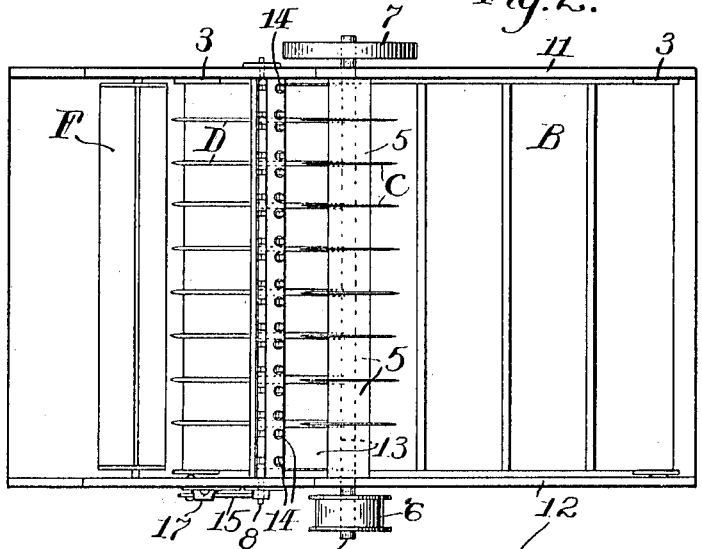
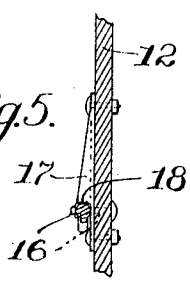
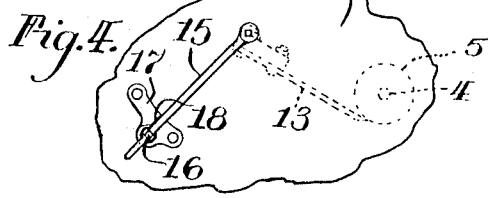

UNITED STATES PATENT OFFICE.

ELI P. CHARLAND, OF SOMERSET, WISCONSIN.

SELF-FEEDER FOR THRESHING-MACHINES.

1,035,113. Specification of Letters Patent. Patented Aug. 6, 1912.

Application filed December 30, 1909. Serial No. 535,651.

*To all whom it may concern:*

Be it known that I, ELI P. CHARLAND, a citizen of the United States, residing at Somerset, in the county of St. Croix and State of Wisconsin, have invented a new and useful Improvement in Self-Feeders for Threshing-Machines, of which the following is a specification.

My invention relates to an improvement in self feeders for threshing machines and more particularly to a guard for the band cutters thereof.

The primary object of my invention is to protect the shaft between the knives from straw winding thereon and clogging the feeder and to do away at once with any wet, gummy or tangled straw that may tend to start winding around the shaft.

Another advantage is that the attachment may be swung with its tines down from the cutters thereby making easy access to the knives when taken out. By the use of my invention a steady speed of the cutters is maintained.

In the accompanying drawings forming part of this specification Figure 1 is a side elevation partly in section of a band cutter and feeder for a threshing machine having my improvement applied thereto; Fig. 2 is a plan of the construction illustrated in Fig. 1; Fig. 3 is a plan of the guard forming part of my improvement; Fig. 4 is a side view of a detail and Fig. 5 is a sectional view of a detail.

In the drawings A represents the frame of a band cutter and feeder for threshing machines, B a horizontal endless canvas carrier having a belt 2 passing around the pulleys 3 the latter being journaled in said frame.

C represents rotary knives which are mounted upon the shaft 4 with the usual collars 5 filling the spaces between said cutters on the shaft. The shaft 4 is journaled in the sides of the frame in the usual manner and has a suitable drive pulley 6 and fly-wheel 7. At the inner end of the carrier is the usual guide D and a rotary blade beater F, which are arranged as is customary to advance the grain into the threshing machine.

Adjoining the rotary knives is a guard bar G having plates 13 secured thereto, said bar also having a smaller bar 9 secured thereon having projecting ends 8 which serve as gudgeons or journals in the sides 11 and 12 of the frame. Bolts 10 and 14 passing respectively through the bars 9 and G and the plates 13, and the bar G and plates 13, serve to fasten said parts together as illustrated in the drawings. The plates 13 are broad faced and resilient and their outer ends extend down and press up against the perimeters of the collars 5. These plates thus substantially occupy the space edgewise between the cutters, they being spaced slightly apart to allow the cutters to revolve freely between them. Straw is thus effectively prevented from winding upon the shaft 4 or collars 5 between the cutters. One end of the shaft 9 projects from the outer surface of the side 12 and has secured thereto a lever 15 the free end of which is separably connected by means of a bolt 16 to the fixture 17 on the side 12 to hold the plates 13 tightly impigned upon the collars 5. When it is desired to remove any or all of the cutters C from the shaft 4 the lever 15 may be uncoupled from the fixture 17 and the plates 13 swung down away from the cutters. A shoulder 18 on the fixture 17 limits the movement of the lever 15 in one direction said lever being resilient and springing over said shoulder into engagement.

In operation the cutters revolve in the direction of the arrows indicated in Fig. 1 and the straw is prevented from winding upon the shaft and collars.

I am aware that devices heretofore have been employed in the form of narrow tines projecting between cutters of a band cutter but in such construction or constructions said tines have not occupied substantially the entire space between the cutters as I employ them in my invention.

Having described my invention, what I claim as new and desire to protect by Letters Patent is:—

In a feed for threshing machines, a supporting frame having sides, a plurality of cutters disposed across said frame, a rotatable shaft journaled in said sides and upon which said cutters are mounted, a carrier belt below said cutters, a bar across said frame adjacent said cutters and having its ends pivoted in said sides, a plurality of collars on said shaft and between said cutters serving to space the latter apart, a series of resilient guard plates inclining downwardly substantially in a single plane at the rear of said cutters and rigidly mounted upon said bar with their forward lower ends projecting between said cutters and bearing under pressure at their extremities flat against the peripheries of said sleeves in an upward direction to produce an uninterrupted surface for the straw to slide over, said plates occupying substantially the entire space in the plane of said plates between said cutters and serving to prevent straw while passing between said carrier and cutters from winding upon said cutters and their support, a lever attached to said bar and means for engaging said lever to hold said bar with its guard plates impinging against said collars.

In testimony whereof, I have signed my name to this specification, in the presence of two subscribing witnesses.

ELI P. CHARLAND.

Witnesses:
H. L. FISCHER,
F. G. BRADBURY.

Copies of this patent may be obtained for five cents each, by addressing the "Commissioner of Patents, Washington, D. C."